US009175367B2

(12) United States Patent
Ishikawa

(10) Patent No.: US 9,175,367 B2
(45) Date of Patent: *Nov. 3, 2015

(54) PROCESS FOR NEUTRALIZING BAUXITE DISSOLUTION RESIDUAL SUBSTANCE AND PROCESS FOR PRODUCING ALUMINUM HYDROXIDE

(71) Applicant: SHOWA DENKO K.K., Minato-ku, Tokyo (JP)

(72) Inventor: Isao Ishikawa, Yokohama (JP)

(73) Assignee: SHOWA DENKO K.K., Tokyo (JP)

( * ) Notice: Subject to any disclaimer, the term of this patent is extended or adjusted under 35 U.S.C. 154(b) by 53 days.

This patent is subject to a terminal disclaimer.

(21) Appl. No.: 14/201,437

(22) Filed: Mar. 7, 2014

(65) Prior Publication Data
US 2014/0186240 A1 Jul. 3, 2014

Related U.S. Application Data

(62) Division of application No. 12/810,452, filed as application No. PCT/JP2008/073903 on Dec. 22, 2008, now Pat. No. 8,679,427.

(30) Foreign Application Priority Data

Dec. 26, 2007 (JP) ................................. 2007-335140

(51) Int. Cl.
*C01F 7/26* (2006.01)
*C22B 21/00* (2006.01)
(Continued)

(52) U.S. Cl.
CPC ............. *C22B 21/0015* (2013.01); *C01F 7/066* (2013.01); *C01F 7/26* (2013.01); *C02F 1/66* (2013.01)

(58) Field of Classification Search
None
See application file for complete search history.

(56) References Cited

U.S. PATENT DOCUMENTS 3,582,268 A 6/1971 Sato et al.
3,986,975 A 10/1976 Bayer et al.
(Continued)

FOREIGN PATENT DOCUMENTS

AU 89768/91 A 6/1992
CA 1 174 008 A 9/1984
(Continued)

OTHER PUBLICATIONS

Office Action with a mailing date of Apr. 16, 2014 for Indonesian Patent Application No. W-00201002438.
(Continued)

*Primary Examiner* — Anthony J Zimmer
*Assistant Examiner* — Justin Bova
(74) *Attorney, Agent, or Firm* — Sughrue Mion, PLLC

(57) ABSTRACT

A process for neutralization is provided which can maintain a high solid content of a bauxite dissolution residual substance slurry even after a neutralization treatment is completed and the stabilize pH within a short time of the neutralization treatment. Such a process for neutralizing a bauxite dissolution residual substance containing a desiliconizing product which is generated in the production process of aluminum hydroxide using Bayer process, includes: mixing a bauxite dissolution residual substance or a bauxite dissolution residual substance slurry with sulfuric acid in an amount ranging from 0.6 to 1.2 equivalence to the total amount of sodium contained in the bauxite dissolution residual substance or a bauxite dissolution residual substance slurry, such that the solid content after mixing becomes 400 to 700 g/l to gelate the mixture, and thereafter obtaining a bauxite dissolution residual substance neutralized slurry.

6 Claims, 1 Drawing Sheet

(51) Int. Cl.
*C01F 7/06* (2006.01)
*C02F 1/66* (2006.01)

(56) References Cited

U.S. PATENT DOCUMENTS

| | | | |
|---|---|---|---|
| 4,119,698 | A | 10/1978 | Zimmer et al. |
| 6,248,302 | B1 * | 6/2001 | Barnett et al. ............ 423/83 |
| 7,067,106 | B2 | 6/2006 | Malito |

FOREIGN PATENT DOCUMENTS

| | | | |
|---|---|---|---|
| CA | 1174008 A * | 9/1984 | |
| DE | 1592104 A1 | 10/1970 | |
| EP | 0048417 A1 | 3/1982 | |
| FR | 2197822 A | 3/1974 | |
| GB | 1398831 A | 6/1975 | |
| GB | 1 489 616 | 10/1977 | |
| JP | 49-10892 | 3/1974 | |
| JP | 59-15719 B2 | 4/1984 | |
| JP | 2-111627 A | 4/1990 | |
| JP | 02-294392 A | 12/1990 | |
| JP | 3663647 B | 6/2005 | |
| RU | 2140998 C1 | 11/1999 | |
| WO | 2005/047183 A1 | 5/2005 | |
| WO | 2006/004208 A1 | 1/2006 | |
| WO | WO 2006004208 A1 * | 1/2006 | |

OTHER PUBLICATIONS

Zhang Xunpeng; "Introduction to Metallurgical Engineering"; Central South University Press; Dec. 1998; First Edition; pp. 137-138.
First Office Action issued Jan. 4, 2012 in the Chinese Patent Office, in corresponding Chinese Patent Application No. 200880125426.2.
Notice of Allowance with a mailing date of Mar. 4, 2013 for corresponding Taiwanese Patent Application No. 097149815.

* cited by examiner

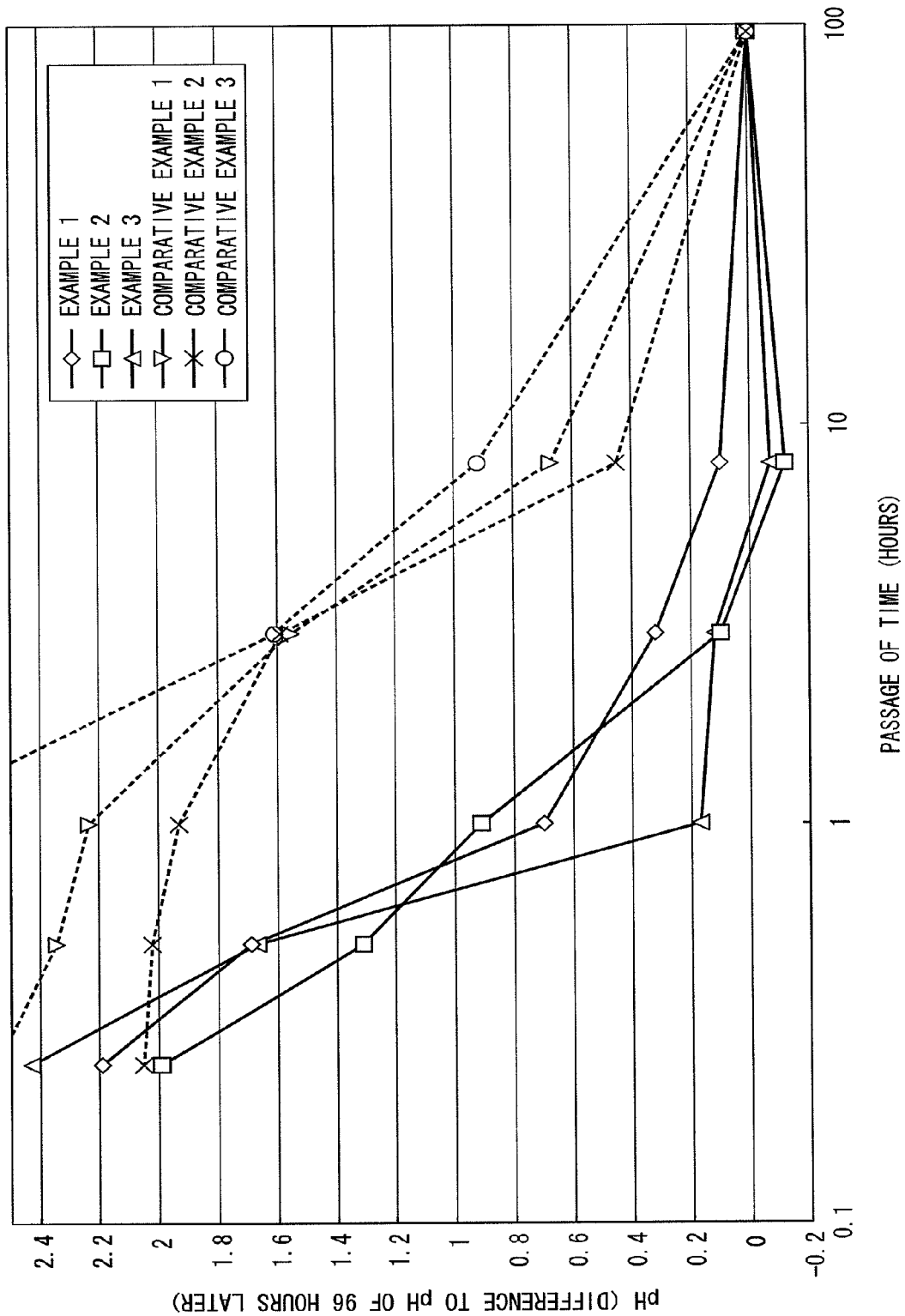

PROCESS FOR NEUTRALIZING BAUXITE DISSOLUTION RESIDUAL SUBSTANCE AND PROCESS FOR PRODUCING ALUMINUM HYDROXIDE

CROSS-REFERENCE TO RELATED APPLICATIONS

This is a Divisional Application of U.S. application Ser. No. 12/810,452 filed Jun. 24, 2010 issued as U.S. Pat. No. 8,679,427, which is a National Stage Entry of PCT International Application No. PCT/JP2008/073903 filed Dec. 22, 2008, which claims benefit of Japanese Patent Application No. 2007-335140 filed Dec. 26, 2007. The above-noted applications are incorporated herein by reference in their entirety.

TECHNICAL FIELD

The present invention relates to a process for neutralizing a bauxite dissolution residual substance containing a desiliconizing product which is generated in the production process of aluminum hydroxide using a Bayer process, in particular a process for neutralizing a bauxite dissolution residual substance being capable of maintaining pH stably after neutralization, and a process for producing aluminum hydroxide using the process.

Priority is claimed on Japanese Patent Application No. 2007-335140, filed Dec. 26, 2007, the content of which is incorporated herein by reference.

BACKGROUND ART

In a Bayer process for producing aluminum hydroxide from bauxite as a raw material, approximately 860 kg of a bauxite dissolution residual substance is generated per 1 t of reduced mass of alumina as a product. Since such a large amount of a bauxite dissolution residual substance is generated, it is necessary to treat a bauxite dissolution residual substance quickly in order to produce aluminum hydroxide effectively.

In a Bayer process, a soluble alumina component contained in bauxite ore is usually dissolved and extracted at a high temperature with an alkaline solution such as a caustic soda or a sodium aluminate solution, and the resultant extracted slurry is subjected to solid-liquid separation into a bauxite dissolution residual substance and a sodium aluminate solution.

Since the separated bauxite dissolution residual substance exhibits strong alkali, it is subjected to treatment such as pH adjustment so as to be suitable for a final disposal method (sea dumping, an inning). The treated bauxite dissolution residual substance is usually exhausted in a slurry state outside the system.

Bauxite dissolution residual substance separated from sodium aluminate solution exhibits a pH of approximately 12-13, even after it is washed. In general, a bauxite dissolution residual substance is subjected to neutralizing treatment by adding mineral acid such as, for example, a sulfuric acid, hydrochloric acid is further added to the bauxite dissolution residual substance slurry.

However, a bauxite dissolution residual substance slurry has the property that the pH value of the slurry increases with the passage of time after neutralization. This is due to the fact that the neutralization decomposition rate of a sodalite contained in a bauxite dissolution residual substance is low, or to the fact that elution of alkaline components drawn into pores of sodalite crystal, such as sodium aluminate, etc.

For example, even if a bauxite dissolution residual substance slurry is neutralized so that the pH value thereof will be approximately 7, isolation and elution of $Na_2O$ components from non-reacted sodalite contained in the bauxite dissolution residual substance gradually occur, thereby increasing the pH value of the bauxite dissolution residual substance slurry. Thus, in the neutralization process of a bauxite dissolution residual substance slurry with acid, neutralization is performed aiming at a pH which is lower than desired pH value.

However, a bauxite dissolution residual substance slurry has a property that the bauxite dissolution residual substance slurry will be viscous to gelate in neutralizing, when the pH becomes approximately 4.5. Therefore it is not possible to aim at too much low pH value.

In addition, the amount of $Na_2O$ contained as a sodalight in a bauxite dissolution residual substance slurry varies greatly, depending on the raw material bauxite and operating conditions. For example, the quantity of sodalight often varies greatly depending on the amount of reactive silica contained in the bauxite as a raw material. In other words, it is not always possible to control the pH value so that it is within a desired range by simply adjusting the pH value, due to the sodalite contained in the bauxite dissolution residual substance slurry.

In order to solve this problem, the following Patent document 1 discloses a method for neutralizing a bauxite dissolution residual substance characterized in that the neutralizing treatment is divided into at least three steps and that the first step of neutralization is performed such that objective value of pH value is aimed at a value ranging from 7 to 10. In the Patent Document 1, it is disclosed that in accordance with this method, solidification of a bauxite dissolution residual substance slurry can be avoided, considering of material of the neutralization equipment becomes unnecessary, and the total amount of sulfuric acid required for neutralization can be greatly reduced, compared to those of the method for neutralizing comprising one step and the method for neutralizing comprising two steps. However, this method requires a long time because neutralization is performed at plural steps.

As a solution for solving this problem, the following Patent Document 2 discloses a method for neutralizing the bauxite dissolution residual substance slurry which comprises: a single step of the neutralizing bauxite dissolution residual substance slurry using a thin acid of 3N or less so as not to lower the pH value thereof, thereby preventing increases of viscosity and gelation.

In accordance with this method, the operation time for adding acid is shortened. However, as for neutralization and decomposition of a sodalite contained in the bauxite dissolution residual substance, the decomposition rate of $Na_2O$ contained in sodalite using a thin acid becomes low. Thus, it also takes a long time for the pH to become stable. In addition, in this method, the quantity of the treatment solution increases because the use of thin acid, a neutralizing reaction apparatus becomes large, thereby increases the cost of equipment. In addition, it requires concentration of the treated liquid, if handling such as the transportation of slurry after processing is considered.

[Patent Document 1] Japanese Patent Publication No. 59-15719

[Patent Document 2] Japanese Patent No. 3,663,647

DISCLOSURE OF THE INVENTION

In view of such circumstances, the inventors of the present invention have thoroughly researched performing neutralization which can maintain high solid content of bauxite dissolution residual substance slurry even after the neutralization treatment is completed and quickly stabilize pH within a short time after neutralization treatment is completed. As the result, they found that the above problem can be solved by adding sulfuric acid in an amount approximately equivalent to the amount of high concentration bauxite dissolution residual substance slurry so as to gelate the slurry, thereby re-slurrying bauxite dissolution residual substance slurry to complete the present invention.

In order to achieve the above object, the present invention has adopted the following constitution.

A first aspect of the present invention provides a process for neutralizing a bauxite dissolution residual substance containing the desiliconizing product which is generated in the production process of aluminum hydroxide using a Bayer process, including: mixing a bauxite dissolution residual substance or a bauxite dissolution residual substance slurry with a sulfuric acid in an amount ranging from 0.6 to 1.2 equivalence to the total amount of sodium contained in the bauxite dissolution residual substance or bauxite dissolution residual substance slurry, such that the solid content after mixing becomes 400 to 700 g/l to gelate the mixture, and thereafter obtaining bauxite dissolution residual substance neutralized slurry.

A second aspect of the present invention provides the process for neutralizing a bauxite dissolution residual substance in accordance with the first aspect, in which the bauxite dissolution residual substance is a slurry obtained by washing or diluting bauxite dissolution residual substance containing a desiliconizing product which is generated in the production process of aluminum hydroxide using a Bayer process A third aspect of the present invention provides the process for neutralizing a bauxite dissolution residual substance in accordance with the first aspect or the second aspect, in which the sulfuric acid is a concentrated sulfuric acid or a fuming sulfuric acid.

A fourth aspect of the present invention provides the process for neutralizing a bauxite dissolution residual substance in accordance with any one of the first to the third aspects, in which the mixing is performed within 5 minutes.

A fifth aspect of the present invention provides the process for neutralizing a bauxite dissolution residual substance in accordance with any one of the first to the fourth aspects, further including the step of agitating the gelated mixture.

A sixth aspect of the present invention provides a process for producing an aluminum hydroxide by a Bayer process, including: neutralizing a bauxite dissolution residual substance containing a desiliconizing product which is generated in the process using the process for neutralizing a bauxite dissolution residual substance in accordance with any one of the first aspect to fifth aspect.

A seventh aspect of the present invention provides a process for producing an aluminum hydroxide in accordance with the sixth aspect, in which the neutralized bauxite dissolution residual substance is discharged outside the system within 1 to 8 hours after neutralization.

According to the present invention, there is little increase in of the amount of neutralized solution and pH of the slurry after neutralization is stabilized quickly in neutralizing bauxite dissolution residual substance containing desiliconizing product, and hence it is possible to determine early whether or not pH can be controlled to be desired value. As a result, it is possible to treat a bauxite dissolution residual substance at a low cost of transport and a low throughput, with hardly detaining bauxite dissolution residual substance neutralized slurry during production of aluminum hydroxide.

BRIEF DESCRIPTION OF DRAWINGS

FIG. 1 is a graph which shows relationship between the pH (difference to pH of 96 hours later) of a bauxite dissolution residual substance neutralized the slurry of Examples 1 to 3 and Comparative Examples 1 to 3, and the passage of time after neutralization.

BEST MODE FOR CARRYING OUT THE INVENTION

Embodiments of the present invention will be given below, with reference to the drawings. According to the present invention, a bauxite dissolution residual substance or a bauxite dissolution residual substance slurry containing a desiliconizing product to be generated during a production process of aluminum hydroxide by a Bayer process is mixed with sulfuric acid so as to obtain the predetermined amount of solid content needed, and then the resultant mixture is gelated. For example, this gel mixture converts to a slurry again when it is allowed to stand, thereby obtaining a bauxite dissolution residual substance neutralized slurry with little pH change. According to the present invention, a bauxite dissolution residual substance or a bauxite dissolution residual substance slurry is neutralized by such an operation.

It should be noted that, in the following explanation, a gel mixture that has been neutralized with sulfuric acid is referred to as a mixture and a bauxite dissolution residual substance neutralized slurry may be simply referred to as neutralized slurry.

(Bauxite Dissolution Residual Substance, Bauxite Dissolution Residual Substance Slurry)

In the production process of aluminum hydroxide by a Bayer process, a bauxite dissolution residual substance which is separated from a sodium aluminate solution by solid liquid separating means such as sedimentation separation or filtration is usually in the form of a cake or slurry having a high solid content just after separated, but the bauxite dissolution residual substance may be converted to a slurry by diluting it with, for example, water, if necessary, taking easiness of the later handling into consideration. In the present specification, a dissolution residual substance after solid-liquid separation is referred to as bauxite dissolution residual substance, and what is in the form of slurry obtained by diluting or washing mentioned later a bauxite dissolution residual substance is simply referred to as a bauxite dissolution residual substance slurry. Both of them are those which can be neutralized in the neutralization process of the present invention. It should be noted that the difference between a cake and slurry is the difference in solid content. If necessary, the solid content may be adjusted to be 400 to 700 g/l, and preferably 450 to 650 g/l, by mixing it with sulfuric acid, mentioned later.

When the solid content after mixing is less than 400 g/l, the pH after neutralization is hard to be stabilized. In addition, the amount of treatment solution increases.

On the other hand, when the amount of solid content is high, neutralized slurry becomes highly viscous and is hard to be handled. The amount of solid content after mixing where it is easy to be handled is not more than 700 g/l.

The solid content of the bauxite dissolution residual substance or the bauxite dissolution residual substance slurry can be adjusted by concentrating (for example, by sedimentation) or diluting (for example, dilution with water) the bauxite dissolution residual substance or the bauxite dissolution residual substance slurry.

The step of concentrating or diluting may be a step of washing bauxite dissolution residual substance to recover adhered sodium aluminate. For example, a valuable sodium aluminate which adheres to a dissolution residual substance can be recovered by performing decantation in a counterflow washing method in a multistage washing thickener.

When a bauxite dissolution residual substance is washed, the resultant dissolution residual substance after washing becomes a slurry containing thin sodium aluminate solution. The solid content of the slurry at this time is adjusted to be the above range. Since the use of the washed bauxite dissolution residual substance slurry can reduce the amount of sulfuric acid used in the subsequent step, it is preferable.

(Mixing with Sulfuric Acid)

Neutralization is performed by mixing sulfuric acid in an amount ranging from 0.6 to 1.2 equivalent, preferably from 0.7 to 1 equivalent to the total Na contained in the resultant bauxite dissolution residual substance or bauxite dissolution residual substance slurry, with the bauxite dissolution residual substance or bauxite dissolution residual substance slurry.

If the amount of sulfuric acid is less than 0.6 equivalent, then the pH of the mixture after neutralization is likely to be unstable. In addition, the resultant mixture may not gelate. Whereas, if the amount of sulfuric acid is more than 1.2 equivalent, then the resultant mixture may remain a gelatin, and may hardly become slurry again. The concentration of sulfuric acid can be adjusted such that the neutralized slurry has a solid content within the above range.

As for a bauxite dissolution residual substance slurry, the lower the solid content thereof is, the lower the viscosity thereof becomes, and the easier handling becomes. Therefore, the concentration of sulfuric acid to be added is preferably as high as possible, so as not to dilute the bauxite dissolution residual substance slurry. That is, the sulfuric acid to be added to a bauxite dissolution residual substance slurry is preferably concentrated sulfuric acid, more preferably fuming sulfuric acid, and particularly preferably fuming sulfuric acid of not less than 40N. It should be noted that, concentrated sulfuric acid indicates a sulfuric acid of not less than 36N.

In addition, as for a bauxite dissolution residual substance, the concentration of sulfuric acid to be mixed is adjusted such that the solid content of the neutralized slurry after neutralization is within the above range.

When sulfuric acid is mixed with a bauxite dissolution residual substance or bauxite dissolution residual substance slurry, the sulfuric acid is added at a considerably high rate, such that pH deteriorates and the slurry after mixing are gel. Although speed at which a sulfuric acid is added varies depending on the container and agitating method, it may be aimed at that the whole mixed slurry gelates. It is usually the rate at which addition can be completed in five minutes.

Generally, gelating of a bauxite dissolution residual substance or of a bauxite dissolution residual substance slurry should be avoided, because the gelation causes clogging of piping and high loading to an agitator. However, if it is allowed to stand as it is, then the gel mixture obtained by neutralizing under the above conditions will become a slurry again, and the pH of this slurry will stabilize in a short amount of time. Thus a bauxite dissolution residual substance neutralization slurry having a stabled pH is obtained.

(Agitation of Gel Mixture)

The resultant gel mixture is preferably agitated for a short amount of time. In this case, an agitator applicable to high viscosity substance is necessary, which is preferable for mixing sulfuric acid easily uniformly and for shortening the amount of time needed to convert the mixture back into the slurry and stabilize the pH.

(pH Stability)

According to the present invention, the difference in pH between each of the mixture or neutralized slurry of one hour later, three hours later, and eight hours later from the neutralization and neutralized slurry of 96 hours later from the neutralization is usually 1.2, 1.0 and not more than 0.5, respectively. In particular, when the gel mixture is agitated, the difference in pH becomes 1.0, 0.5 and not more than 0.2, respectively, and hence agitating is preferable. It should be noted that the time from the neutralization is one from completing of mixing of sulfuric acid.

That is, according to the production process of aluminum hydroxide by a Bayer process including the neutralization method of bauxite dissolution residual substance of the present invention, the gel mixture becomes a slurry and the pH is stabilized within a very short time of 1-8 hours from the neutralization, and hence bauxite dissolution residual substance neutralized slurry can be discharged outside the system with a pH accurately in the range of the above range of difference in pH.

EXAMPLE

The present invention will be explained specifically referring to embodiments below, but the scope of the present invention is not limited thereto.

It should be noted that the measurement method in the following examples and comparative example will be explained.

1) pH measurement: A glass electrode-type pH meter was used.

2) Total soda content of bauxite dissolution residual substance slurry:
A sample of the bauxite dissolution residual substance slurry was placed in an evaporation dish and was dried at 110° C. for 3 hours to be solidified, the resultant dried solidified sample was crushed, and thereafter the resultant sample was subjected to fluorescence X-ray analysis to obtain total soda content (T-$Na_2O$) contained in the bauxite dissolution residual substance neutralized slurry.

3) Solid content:
The slurry (or gel mixture) was filtered under reduced pressure using a filter paper, washed with water, and thereafter the resultant dried sample was measured to obtain the dry mass thereof, and then the solid content of the slurry was obtained therefrom.

Example 1

A bauxite dissolution residual substance containing a slurry-like desiliconizing product separated from a sodium aluminate solution during production of aluminum hydroxide by a Bayer process was diluted with water to obtain a bauxite dissolution residual substance slurry having solid content of 500 g/l. This slurry had a composition of 15% by mass of $SiO_2$, 23% by mass of $Al_2O_3$, 38% by mass of $Fe_2O_3$, 7% by mass of $TiO_2$, 9% by mass of $Na_2O$ (each of analysis values is expressed, under the assumption that the dry mass of the slurry is 100% by mass.) In addition, the pH of this slurry was 12.3.

1.5 kg of the resultant bauxite dissolution residual substance slurry was put into a 2.5 liter beaker, while the slurry was stirred with a throwing-in type stirrer, 49N fuming sulfuric acid in an amount of 1.0 equivalent to the total soda content contained in the bauxite dissolution residual substance was added thereto for approximately 1 minute to neutralize the slurry. The solid content in the slurry after adding the sulfuric acid was 481 g/l.

At this time, the resultant mixture after neutralization became a gel. However, agitating was continued further, and then the resultant mixture became a slurry again 25 minutes after the neutralization to obtain a neutralized slurry.

In addition, during agitation, the pH of the slurry was measured by timewise. The pH of the slurry 1 hour, 3 hours, 8 hours, and 96 hours after the neutralization of sulfuric acid was 6.95, 7.33, 7.55 and 7.65, respectively. Changes in the pH were shown in FIG. 1, and tables 1 and 2. The pH increased by only 0.1 between 8 hours and 96 hours after the neutralization of sulfuric acid.

Example 2

Treatment and measurement were conducted in the same way as in Example 1, with the exception of changing the amount of sulfuric acid to be 0.8 equivalent. When sulfuric acid was added, the slurry became a gel mixture. However, as a result of the agitation being continued, the resultant gel mixture became a slurry again 20 minutes after the neutralization to obtain a neutralized slurry. The solid content of the slurry after the addition of sulfuric acid thereinto was 485 g/l.

The pH of the slurry 1 hours, 3 hours, 8 hours, and 96 hours after neutralization of sulfuric acid was 7.16, 7.97, 8.19 and 8.07 respectively. Changes in the pH are shown in FIG. 1 and tables 1 and 2. The pH decreased by 0.12 between 8 hours and 96 hours after the neutralization.

Example 3

Treatment and measurement were conducted in the same way as in Example 1, with the exception of changing the amount of sulfuric acid to be 0.7 equivalent and not diluting the bauxite dissolution residual substance with water. When sulfuric acid was added, the slurry became a gel mixture. However, as a result of the agitation being continued, the resultant gel mixture became a slurry again 30 minutes after the neutralization to obtain a neutralized slurry. The solid content of the slurry after adding sulfuric acid thereinto was 645 g/l.

The pH of the slurry 1 hours, 3 hours, 8 hours, and 96 hours after neutralization of sulfuric acid was 8.71, 8.76, 8.95 and 8.88 respectively. Changes in the pH are shown in FIG. 1 and tables 1 and 2. The pH decreased by 0.07 between 8 hours and 96 hours after the neutralization.

Comparative Example 1

Treatment and measurement were conducted in the same way as in Example 1, with the exception of changing the amount of sulfuric acid to be 0.5 equivalent. When sulfuric acid was added, the slurry remained in a slurry state. The solid content of the slurry after the addition of sulfuric acid thereinto was 490 g/l.

The pH of the slurry 1 hours, 3 hours, 8 hours, and 96 hours after neutralization of sulfuric acid was 7.78, 8.46, 9.34 and 10.01 respectively. Changes in the pH are shown in FIG. 1 and tables 1 and 2. The pH increased by 0.67 between 8 hours and 96 hours after the neutralization.

Comparative Example 2

Treatment and measurement were conducted in the same way as in Example 1, with the exception of using diluted sulfuric acid of 7N as the sulfuric acid. When sulfuric acid was added, the slurry remained in a slurry state. The solid content of the slurry after the addition of sulfuric acid thereinto was 391 g/l. Each of pH at 1 hours later, 3 hours later, 8 hours layer, and 96 hours later from the neutralization was 6.18, 6.52, 7.66 and 8.11 respectively. Changes in the pH are shown in FIG. 1 and tables 1 and 2. The pH increased by 0.45 between 8 hours and 96 hours after the neutralization.

Comparative Example 3

Treatment and measurement were conducted in the same way as in Example 1, with the exception of using diluted sulfuric acid of 7N as the sulfuric acid and changing the amount of sulfuric acid to be 0.5 equivalent. When sulfuric acid was added, the slurry remained in a slurry state. The solid content of the slurry after the addition of sulfuric acid thereinto was 432 g/l. The pH of the slurry 1 hours, 3 hours, 8 hours, and 96 hours after neutralization of sulfuric acid was 7.46, 8.78, 9.47 and 10.39 respectively. Changes in the pH are shown in FIG. 1 and tables 1 and 2. The pH increased by 0.92 between 8 hours and 96 hours after the neutralization.

It should be noted that Table 1 is a list showing correlation between pH of bauxite dissolution residual substance neutralized slurry of Examples 1 to 3 and Comparative Examples 1 to 3 and passage of time from the neutralization. In addition, Table 2 shows a list of relative value (difference) of pH between 96 hours later and 0 to 8 hours later, and passage of time from the neutralization, which is a list corresponding to FIG. 1.

TABLE 1

| Time (hours) | Example 1 | Example 2 | Example 3 | Comparative Example 1 | Comparative Example 2 | Comparative Example 3 |
| --- | --- | --- | --- | --- | --- | --- |
| | \multicolumn{6}{c}{Equivalence of sulfuric acid} | | | | | |
| | 1.0 | 0.8 | 0.7 | 0.5 | 1.0 | 0.5 |
| Before addition | 12.34 | 12.22 | 12.39 | 12.39 | 12.34 | 12.22 |
| 0.25 | 5.44 | 6.08 | 6.45 | 7.46 | 6.06 | 7.33 |
| 0.5 | 5.96 | 6.76 | 7.21 | 7.67 | 6.09 | 7.36 |
| 1 | 6.95 | 7.16 | 8.71 | 7.78 | 6.18 | 7.46 |
| 3 | 7.33 | 7.97 | 8.76 | 8.46 | 6.52 | 8.78 |
| 8 | 7.55 | 8.19 | 8.95 | 9.34 | 7.66 | 9.47 |
| 96 | 7.65 | 8.07 | 8.88 | 10.01 | 8.11 | 10.39 |

TABLE 2

| Passage of time after neutralization (hours) | Example 1 | Example 2 | Example 3 | Comparative Example 1 | Comparative Example 2 | Comparative Example 3 |
|---|---|---|---|---|---|---|
| 0.25 | 2.19 | 1.99 | 2.43 | 2.55 | 2.05 | 3.06 |
| 0.5 | 1.69 | 1.31 | 1.67 | 2.34 | 2.02 | 3.03 |
| 1 | 0.7 | 0.91 | 0.17 | 2.23 | 1.93 | 2.93 |
| 3 | 0.32 | 0.1 | 0.12 | 1.55 | 1.59 | 1.61 |
| 8 | 0.1 | −0.12 | −0.07 | 0.67 | 0.45 | 0.92 |
| 96 | 0 | 0 | 0 | 0 | 0 | 0 |

As shown above, in Examples 1 to 3, a gel mixture was generated after the neutralization, however, the gel mixture changed into slurry after being left to stand for 20 to 30 minutes. The pH of the neutralized slurry was approximately stabilized 8 hours after more than 8 hours from the neutralization, and the absolute value of range of change in pH between 8 hours and 96 hours after the neutralization became not more than 0.2.

On the other hand, in Comparative Examples 1 to 3, the resultant mixture remained in slurry state after the neutralization, without gelation. This is because the concentration or the number of equivalent of sulfuric acid was short. In addition, the pH of the neutralized slurry was unstable only after 8 hours after the neutralization. That is, the absolute value of change width of pH 8 hours to 96 hours after the neutralization ranged from 0.45 to 0.92.

The present invention is applicable to a process for neutralizing a bauxite dissolution residual substance containing a desiliconizing product which is generated in the production process of aluminum hydroxide using Bayer process, in particular a process for neutralizing bauxite dissolution residual substance being capable of maintaining a pH stably after neutralization, and a process for producing aluminum hydroxide using the process.

The invention claimed is:

1. A process for producing aluminum hydroxide by a Bayer process, comprising: neutralizing a bauxite dissolution residual substance containing a desiliconizing product which is generated in the production process of aluminum hydroxide using a Bayer process, said neutralizing comprises: mixing a bauxite dissolution residual substance slurry with sulfuric acid in an amount ranging 0.6 to 1 equivalence to the total amount of sodium contained in the bauxite dissolution residual substance slurry, such that the solid content after mixing becomes 400 to 700 g/l to gelate the mixture, and thereafter obtaining bauxite dissolution residual substance neutralized slurry, wherein the sulfuric acid has a concentration of 40N or greater.

2. The process for producing aluminum hydroxide as claimed in claim 1, wherein the bauxite dissolution residual substance slurry is obtained by washing or diluting a bauxite dissolution residual substance containing the desiliconizing product.

3. The process for producing aluminum hydroxide as claimed in claim 1, wherein the sulfuric acid is a concentrated sulfuric acid or a fuming sulfuric acid.

4. The process for producing aluminum hydroxide as claimed in claim 1, wherein the mixing is completed in 5 minutes or less.

5. The process for producing aluminum hydroxide as claimed in claim 1, further comprising a step of agitating the gelated mixture.

6. The process for producing aluminum hydroxide as claimed in claim 1, wherein said neutralizing is carried out in a neutralization system, and said bauxite dissolution residual substance neutralized slurry is discharged outside the neutralization system within 1 to 8 hours after the neutralization.

* * * * *